United States Patent [19]

Kawano et al.

[11] Patent Number: 4,727,590
[45] Date of Patent: Feb. 23, 1988

[54] MOBILE RADIO COMMUNICATION SYSTEM WITH REPEATER STATION GRID

[75] Inventors: Minori Kawano; Kohji Mihashi, both of Amagasaki, Japan

[73] Assignee: Mitsubishi Denki Kabushiki Kaisha, Tokyo, Japan

[21] Appl. No.: 69,786

[22] Filed: Jul. 6, 1987

[30] Foreign Application Priority Data

Sep. 5, 1986 [JP] Japan ............................. 61-209839

[51] Int. Cl.$^4$ ............................................. H04B 1/00
[52] U.S. Cl. ....................................... 455/33; 379/60; 455/17
[58] Field of Search ............... 455/17, 34, 33; 379/59, 379/60, 63

[56] References Cited

U.S. PATENT DOCUMENTS 4,144,411  3/1979  Frenkiel .............................. 379/60
4,451,699  5/1984  Gruenberg ........................... 379/60
4,553,262 11/1985  Coe ..................................... 455/15
4,554,677 11/1985  Smith et al. ......................... 455/54
4,667,202  5/1987  Kammerlander et al. .......... 342/457

Primary Examiner—Robert Lev
Attorney, Agent, or Firm—Sughrue, Mion, Zinn, Macpeak and Seas

[57] ABSTRACT

A mobile radio communication system has base stations 1a, 1b, 1c at the centers of major service areas A, B, C defined by a contiguous array of hexagons or partially overlapping circles, and repeater or one way relay stations 3a-3m at each vertex or intersection point. The repeater stations have directional receiving antennas subtending successive 120° arcs of surrounding minor service areas similarly defined by a ring array of hexagons or circles, amplifiers for imparting a high gain to signals received from mobile units in the minor service areas, and narrow width transmitting antennas for relaying the amplified signals to the base station closest each mobile unit. Such an arrangement enables a substantial reduction in the transmitter output capacity of the mobile units.

11 Claims, 7 Drawing Figures

1a–1c : BASE STATIONS
2 : MOBILE UNIT
3a–3m : REPEATER STATIONS

1a–1c : BASE STATIONS
2 : MOBILE UNIT
3a–3m : REPEATER STATIONS

MOBILE RADIO COMMUNICATION SYSTEM WITH REPEATER STATION GRID

BACKGROUND OF THE INVENTION

This invention relates to a mobile radio communication system in which base stations are centrally installed in a plurality of geographically adjacent service areas to establish communication via a closest base station between a mobile unit and a called subscriber, and particularly to such a system in which the transmitter output capacity of each mobile unit may be greatly reduced.

Generally, in a "cellular" or mobile phone system of this type a base station is installed in the center of each service area, and is equipped with transmitters having sufficient output capacity or range to reach the entire service area, and high sensitivity receivers. Each mobile unit is also provided with a transmitter of relatively high output and a high sensitivity receiver. In this manner, a communication link may be established between the mobile unit and the base station in the service area in which the mobile unit is traveling.

FIG. 1 shows a prior art arrangement in which base stations 1a, 1b and 1c are centrally installed in geographically adjacent, hexagonal service areas A, B and C. Although hexagonal areas are shown for simplicity, they would actually be more in the nature of overlapping circles as illustrated by the broken lines in the figure. The base stations have omnidirectional antennas. The dimensions of the service areas are defined or determined by the gain of the base station antennas, the output of the transmitters, the sensitivity of the receivers, etc. A mobile unit 2 traveling in service area A, for example, communicates with a called party or subscriber via base station 1a.

More specifically, a signal transmitted from the antenna of the mobile unit 2 is received by the antenna at the base station 1a for service area A, and a called subscriber is accessed by a switchboard (not illustrated) or the like. Once the link is established, return signals from the subscriber are transmitted to the mobile unit 2 via the base station 1a. In this manner telephone service is established between the mobile unit 2 and the subscriber.

In such a direct link prior art system, the transmission output of the mobile unit is smaller than that of the base station. To supplement this difference the base station embodies a highly sensitive receiving system such as a space diversity receiver, a sectarized receiver, etc. The transmission output of the mobile unit is generally only 1/25–1/160 of the transmission output of the base station; the mobile unit output is typically 0.6–4 W when the base station output is 100 W.

With such a mobile radio communication system a relatively large output is thus required for the mobile unit transmitter, and as a result power consumption is inevitably increased. In particular, the battery capacity must be comparatively large, and a small-sized and lightweight portable mobile phone is difficult to manufacture.

SUMMARY OF THE INVENTION

The present invention was made to overcome the above disadvantages of the prior art, and has an object of providing an improved mobile radio communication system in which the transmission output of the mobile unit is considerably reduced, and the size and weight thereof are attendantly decreased.

In accordance with the invention a mobile radio communication system has base stations at the centers of major service areas defined by a contiguous array of hexagons or partially overlapping circles, and repeater or one way relay stations at each vertex or intersection point. The repeater stations have directional receiving antennas subtending successive arcs of surrounding minor service areas similarly defined by a ring array of hexagons or circles, amplifiers for imparting a high gain to signals received from mobile units in the minor service areas, and narrow width transmitting antennas for relaying the amplified signals to the base station closest each mobile unit. Such an arrangement enables a substantial reduction in the transmitter output capacity of the mobile units due to the decreased range needed to reach either a base station or a repeater station from any given point.

DETAILED DESCRIPTION OF THE PREFERRED EMBODIMENTS

Figure 2:
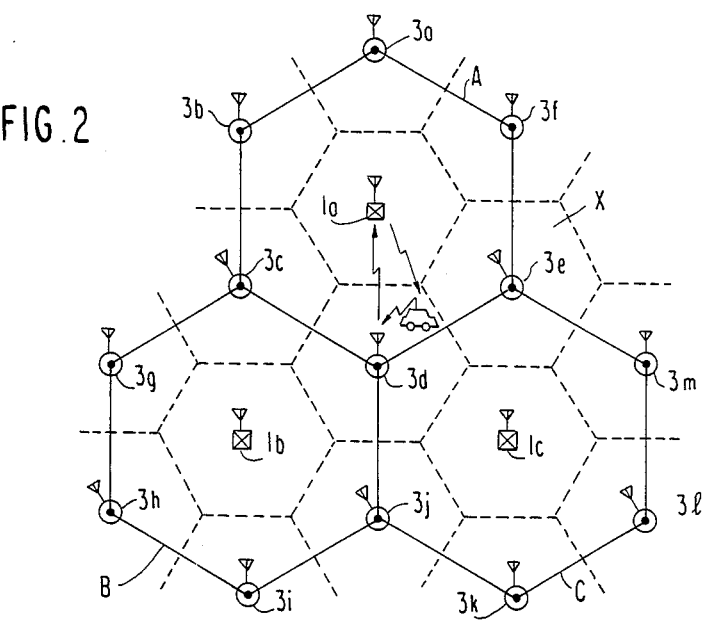
FIG. 2 is a schematic diagram showing a mobile phone system according to an embodiment of the present invention.

Referring to the mobile phone system of the invention as shown in FIG. 2, a plurality of repeater stations 3a, 3b, ..., 3m are respectively installed at the vertices or boundary points of hexagonal service areas A, B, C covered by the base stations 1a, 1b, 1c, and the peripheral areas surrounding these repeater stations 3a–3m are further divided into repeater service areas (smaller hexagonal areas shown by broken lines) to thus define a small or minor honeycomb array within or superimposed on a larger or major honeycomb array.

In this connection, it is not always necessary or even possible to locate the repeater stations at the exact boundary points where each service area A, B and C is adjacent to two other service areas. In the event that a transmission from a mobile unit cannot be received with sufficient sensitivity due to the existence of mountains, buildings, etc., it is sufficient to locate the repeater stations at other suitable nearby sites as a matter of course.

The sizes or areas of the repeater service areas are preferably substantially equivalent to one another, and thus also equivalent to the remaining central or "core" areas of the service areas A, B, C as shown by the broken lines in FIG. 2, but again these configurations may be appropriately varied due to the presence of mountains, buildings or the like. The precise arrangement of the repeater service areas depends on the gain of the receiving antennas, the receiver sensitivities, etc.

Figure 1:
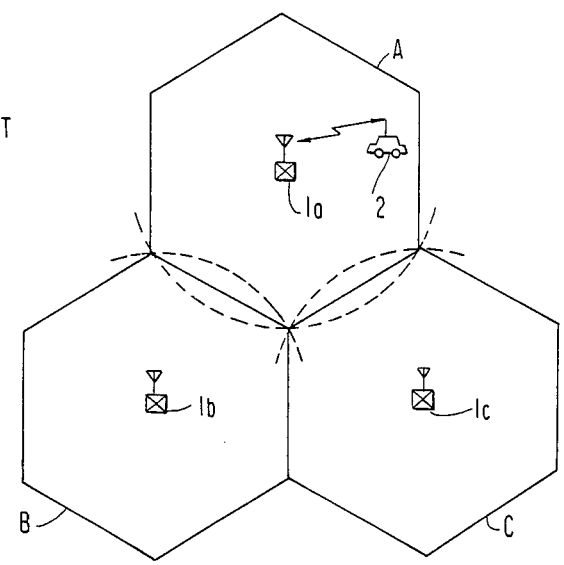
FIG. 1 is a schematic diagram showing a typical mobile phone system according to the prior art.
Figure 3A:
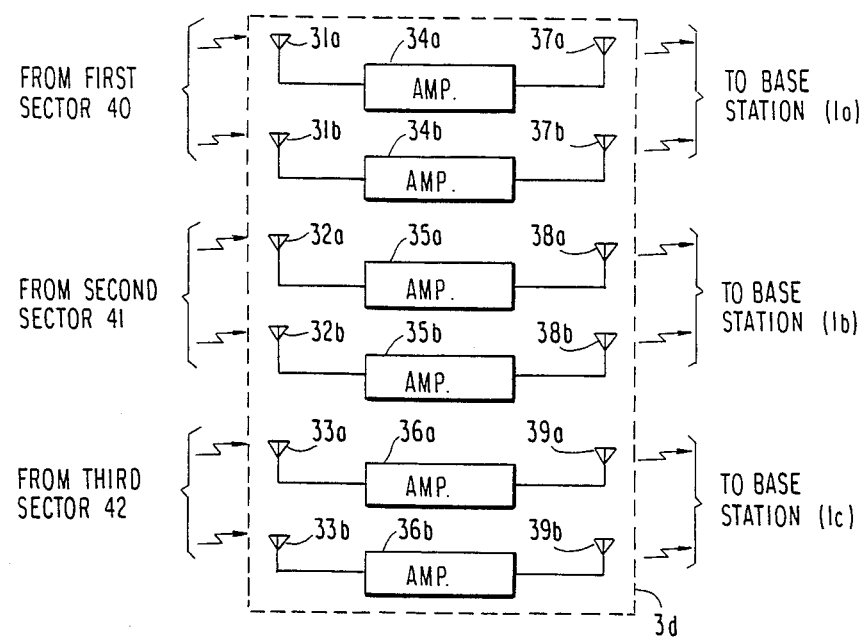
FIGS. 3(a) and 3(b) show a block diagram of an internal section of a repeater station in FIG. 2 and an explanatory view of the repeater service area(s), respectively.
Figure 3B:
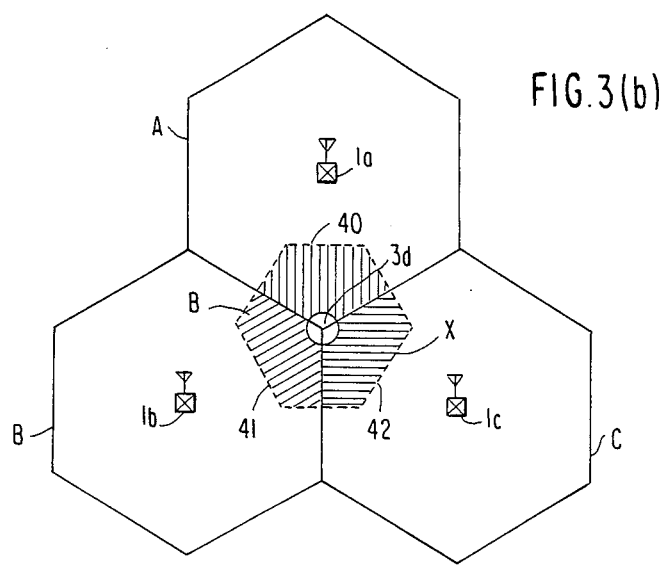

FIGS. 3(a) and 3(b) show the internal section of each repeater station 3a–3m (a repeater station 3d in FIG. 1 is taken as an example in the drawings), and the areas or sectors 40, 41, 42 of the repeater service area X divided corresponding to the base stations 1a-1c, respectively.

As shown in FIG. 3(a), two directional receiving antennas 31a, 31b; 32a, 32b; 33a, 33b are provided for each of the first, second and third sectors 40, 41, 42. Each of these receiving antennas has a directivity of about 120°. The outputs from the receiving antennas are respectively amplified to a specified level by repeater station amplifiers 34a, 34b; 35a, 35b; 36a, 36b, whose outputs are in turn transmitted to the base stations 1a, 1b, 1c corresponding to each sector by highly directional antennas 37a, 37b; 38a, 38b; 39a, 39b. Thus, referring to FIG. 3(b), an output signal from a mobile unit in the first sector 40 is transmitted to base station 1a via repeater station 3d, a signal from a mobile unit in the second sector 41 is similarly transmitted to the associated base station 1b by the repeater station 3d, and a signal from a mobile unit in the third sector 42 is transmitted to base station 1c by the same repeater station.

When a mobile unit travels outside the first sector 40 but within the central core zone of service area A, its signals are transmitted directly to the base station 1a.

Parabolic antennas or the like whose beam widths are narrow and sharp so as to be directed only to a specified base station are employed as the transmitting antennas at the repeater stations, and the receiving antennas 31a-33b and the transmitting antennas 37a-39b are mounted at the repeater station on upper and lower parts of a steel tower with a predetermined spacing to ensure sufficient signal isolation without cross-talk or interference. In addition, dual systems of receiving antennas, repeater amplifiers and transmitting antennas are provided for each of the first, second and third sectors to implement a diversity mode of operation, as described below.

Assuming that the mobile unit 2 is located in the first sector 40 of the repeater station 3d as shown in FIG. 2, a signal from its transmitter 21 (FIG. 4) radiated by antenna 22 is received by antennas 31a, 31b of the repeater station. The signal is then amplified to a specified level by repeater amplifiers 34a, 34b and transmitted to the base station 1a by antennas 37a, 37b. The signal transmitted from the repeating station 3d is received by antennas 11a, 11b of the base station, and is then amplified and level detected by receivers 12a, 12b. The strongest output signal from the two receivers 12a, 12b is selected by a comparator (not shown) diversity switch 13 and outputted to a called subscriber through a switchboard (not illustrated) to thus establish a telephone link between the mobile unit and the subscriber.

Figure 4:
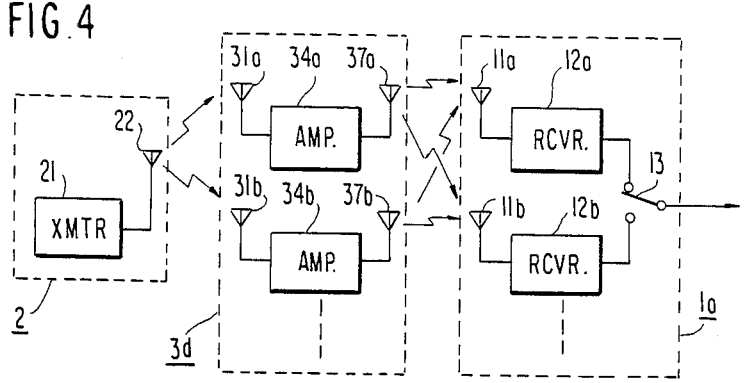
FIG. 4 is a block diagram for explaining the operation of the system of FIGS. 2 and 3.
Figure 5:
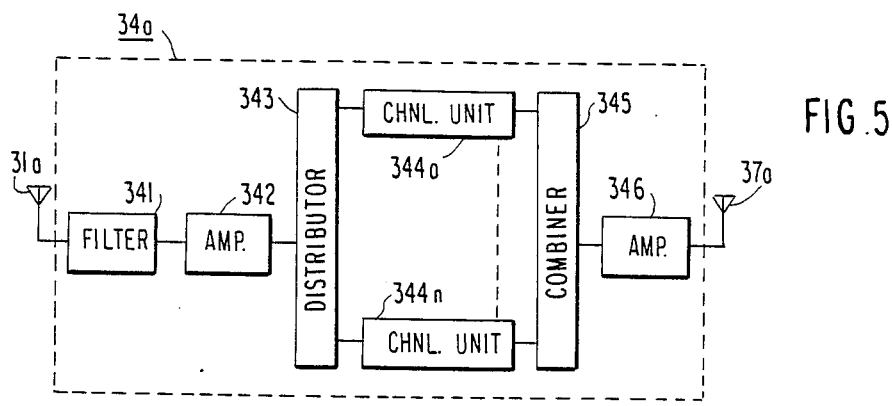
FIG. 5 is a block diagram of an internal section of a repeating amplifier in FIG. 4.

FIG. 5 is a block diagram showing the internal arrangement of one of the repeater station amplifiers shown in FIG. 4. A high frequency signal from the mobile unit 2 is received by the antenna 31a of the repeater station 3d, passed through a wideband filter 341 and amplified by a preamplifier 342. The amplified signal is distributed to at least two channels by a distributor 343, and subjected to selection and amplification in each channel allocated to channel units 344a-344n. These channel units 344a-344n cover a bandwidth from over 10 kHz to several Mhz, and the required signal is thus selected by the combination of these channel units to eliminate any interfering waves. The output of the channel units 344a-344n is combined by a combiner 345, amplified by a power amplifier 346, and transmitted to the base station 1a. The repeater amplifiers 34a-36b shown in FIG. 3(a) have a gain of up to 100 dB including antenna gain, and therefore the relayed transmission to the base station is satisfactorily performed even when the transmission output of the mobile unit is very low.

Figure 6:
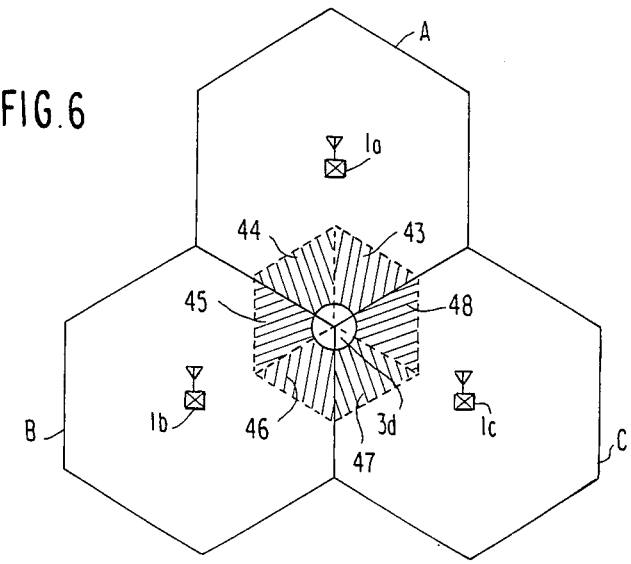
FIG. 6 shows a repeater service area divided into six contiguous sectors.

FIG. 6 shows a modification in which each repeater service area shown in FIG. 3(b) is further divided into two sub-areas, thus forming a total of six sectors. The repeater station 3d is provided with six directional receiving antennas corresponding to each sector, each having a directivity of 60°.

When the mobile unit is located in sector 43, a signal therefrom is transmitted to the base station 1a via a receiving antenna having a directivity of 60° mounted on the repeater station 3d, and when the mobile unit is in sector 44, a signal is transmitted to the base station 1a via another receiving antenna at the repeater station having a directivity of 60°. In the same manner, a mobile unit in sectors 45 or 46 communicates with base station 1b, and when the mobile unit is in sectors 47 or 48 it communicates with base station 1c. The remaining arrangement of this modification is substantially the same as the preceding embodiment described with reference to FIG. 3(b).

In accordance with the invention, the effective major service areas A, B, C of the prior art are thus reduced to one third of their original areas or zones by installing repeater stations at their vertices, and this enables the transmission output necessary for each mobile unit to be reduced to 1/6000 of the transmission output of the base stations owing to the gain (about 100 dB in total) provided by the repeater stations 3a-3m. Such substantial mobile unit output capacity reduction results from the maximum range or transmission distance for each mobile unit being reduced to less than six-tenths, (actually 0.58) that required in the prior art, and from the fact that the output capacity of a transmitter increases exponentially as a function of range.

Although the foregoing embodiments are described with regard to a mobile phone, the present invention can be successfully applied to any other mobile radio communication system bringing about the same advantages.

As alluded to earlier, although hexagonal service areas have been shown surrounding the base stations and repeater stations, they would actually be partially overlapping circles.

What is claimed is:

1. A mobile radio communication system, comprising:
    (a) a plurality of geographical, mutually adjacent major service areas (A, B, C) defined by at least three partially overlapping circles oriented such that their centers are individually disposed at vertices of a triangle,
    (b) a plurality of base stations (1a, 1b, 1c) each having transmitting and receiving antennas individually and centrally disposed in the major service areas,
    (c) a mobile unit (2) including transmitter and receiver means, and
    (d) a plurality of repeater stations (3a-3m) individually disposed surrounding each base station and at points of intersection of said circles, each repeater station lying at the approximate center of a surrounding, circular, minor service area and including first antenna means for receiving a signal transmitted from a mobile unit in said minor service area, means for amplifying said signal, and second antenna means for transmitting said amplified signal to a base station nearest the mobile unit.

2. A system according to claim 1, wherein:

(a) the circles defining the major service areas are of equal diameter and intersect at a common point, and (b) the triangle is an equilateral triangle.

3. A system according to claim 1, wherein the circles defining the minor service areas are of equal diameter and partially overlap to define (a) a ring of circles surrounding each major service area, and (b) a remaining circle surrounding each base station of equal diameter to the minor service area circles such that the range of said mobile unit transmitter may be limited to the radius of said minor service area circles.

4. A system according to claim 2, wherein the circles defining the minor service areas are of equal diameter and partially overlap to define (a) a ring of circles surrounding each major service area, and (b) a remaining circle surrounding each base station of equal diameter to the minor service area circles such that the range of said mobile unit transmitter may be limited to the radius of said minor service area circles.

5. A system according to claim 4, wherein:
(a) each first antenna means comprises three antennas each having a directivity of 120° oriented to embrace contiguous 120° sectors (40, 41, 42) of a circle and having central axes individually aligned with associated base stations, and
(b) each second antenna means comprises three narrow directivity antennas individually oriented towards associated base stations.

6. A system according to claim 5, wherein the first and second antenna means are sufficiently spaced apart on a vertical mounting tower to avoid interference between transmitted and received signals.

7. A system according to claim 6, wherein the transmitting and receiving antennas at each base station are omnidirectional.

8. A system according to claim 4, wherein:
(a) each first antenna means comprises six antennas each having a directivity of 60° oriented to embrace contiguous 60° sectors (43-48) of a circle, and
(b) each second antenna means comprises three narrow directivity antennas individually oriented towards associated base stations.

9. A system according to claim 4, wherein the area of each remaining circle surrounding a base station is approximately one-third the area of the circles defining the major service areas.

10. A mobile radio communication, comprising:
(a) a base station (1a) having transmitting and receiving antennas, said base station being disposed in the center of a major geographical service area (A),
(b) a mobile unit (2) including transmitter and receiver means, and
(c) a plurality of spaced repeater stations (3a-3f) disposed surrounding said base station and individually centrally disposed in associated minor service areas, each repeater station including first antenna means for receiving a signal transmitted from a mobile unit in an associated minor service area, means for amplifying said signal and second antenna means for transmitting said amplified signal to said base station.

11. A system according to claim 11, wherein:
said repeater stations are disposed equally spaced from one another along and around an outer boundary of said major service area corresponding to a maximum transmitting range of said base station.

* * * * *